United States Patent [19]
Rudolf et al.

[11] Patent Number: 5,217,732
[45] Date of Patent: Jun. 8, 1993

[54] FLASH SUPPRESSING MOLD APPARATUS

[75] Inventors: Bruno A. Rudolf; Henry J. Landis, II, both of Monticello, Ind.

[73] Assignee: Landis Plastics, Inc., Chicago Ridge, Ill.

[21] Appl. No.: 702,611

[22] Filed: May 17, 1991

[51] Int. Cl.$^5$ .............................................. B29C 45/34
[52] U.S. Cl. ................................ 425/572; 264/328.9; 425/450.1; 425/451.9; 425/812
[58] Field of Search ...................... 425/572, 577, 450.1, 425/451.9, 812, 546; 264/328.7, 328.9, 328.12

[56] References Cited
FOREIGN PATENT DOCUMENTS
1101007  1/1968  United Kingdom ................ 425/577

Primary Examiner—Tim Heitbrink
Attorney, Agent, or Firm—Fitch, Even, Tabin & Flannery

[57] ABSTRACT

Disclosed is a mold and a method for injection molding plastic components in which the conventional horizontal parting line is replaced with an angled parting line to allow for utilization of increased packing pressure without the formation of flashing. By positioning at least the portion of the parting line extending immediately outward of the mold cavity at an acute angle with respect to the separating direction of two adjacent mold sections, the separation distance between adjacent mold sections can be increased above a critical flashing distance while maintaining the span at the angled parting line below the critical flashing distance to preclude flash formation. Specifically, the span at the angled parting line increases in proportion to the sine of the angle between the angled parting line and the separating direction. Accordingly, higher pressures can be employed to allow for increased production rates with angled parting line molds of the present invention in comparison with conventional molds.

11 Claims, 2 Drawing Sheets

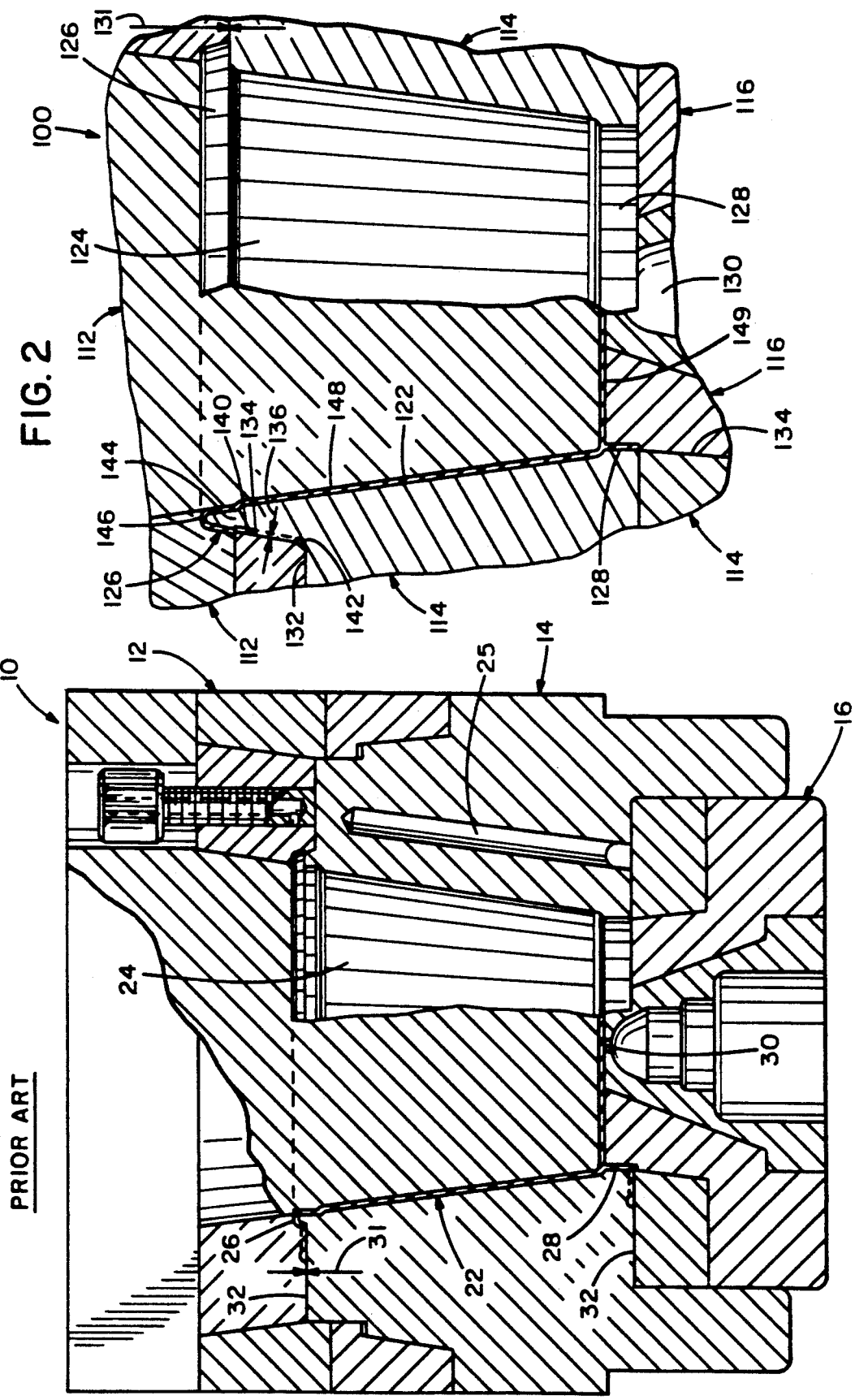

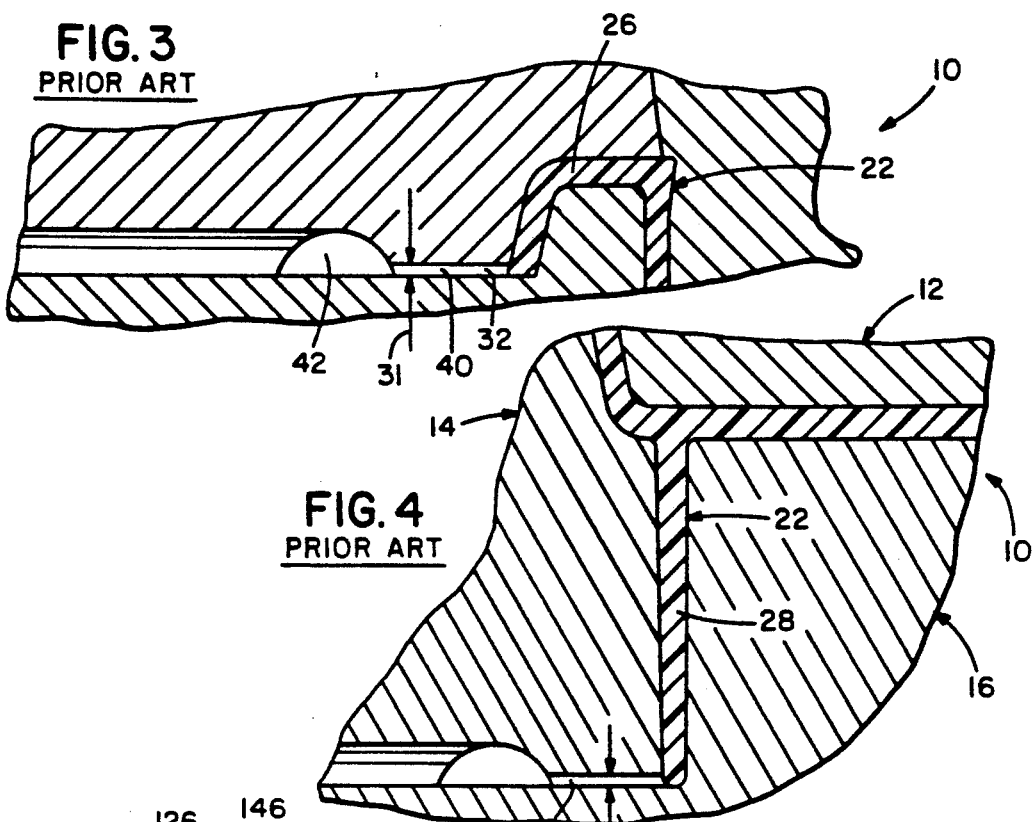
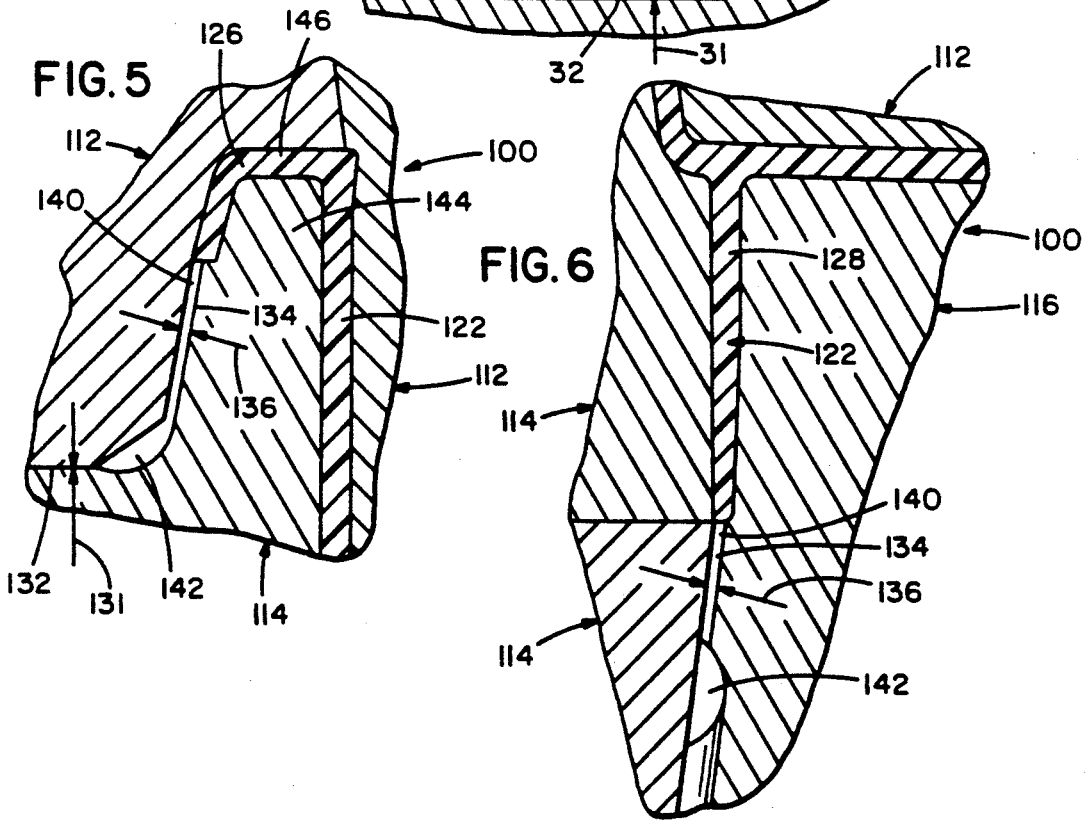

FLASH SUPPRESSING MOLD APPARATUS

FIELD OF THE INVENTION

This invention relates to injection molds and to a method of injecting molding and to providing flash resisting characteristics thereto.

BACKGROUND OF THE INVENTION

The present invention will be described in connection with a high speed, multiple cavity mold used to mold very thin parts and using high pressures, e.g. up to 30,000 psi, to force the molten plastic into the very thin plastic cavity portions located at a considerable distance from a plastic injection port. The embodiment of the invention illustrated is that of a sixteen cavity mold used to manufacture thin dairy containers for holding cottage cheese or the like. Typically, such dairy containers were run on a 500 ton molding press with a ten or eleven second cycle time for the press. When trying to use higher pressures in order to reduce the cycle time, the higher pressures caused a problem with "flashing" or "flash" as will be defined below. The extra pressure tended to separate mold sections sufficiently at the parting line that flashing became a problem. The present invention is not limited to this particular kind of molding press as it has utility in a large number of plastic molding apparatus and methods where flashing is a problem particularly due to the pressure separation along the parting line rather than due to excessive wear at a portion of the parting line adjacent to the cavity.

The high pressure within the mold cavity exerts a separating force on the mold portions which forces the mold portions away from one another. This separating force is often sufficient to overcome the forces holding the mold portions together, resulting in a slight vertical separation of the mold portions along their horizontal parting line. Upon sufficient separation of the mold portions at the parting line, molten plastic squirts from the mold cavity into the narrow region of separation at the horizontal parting line between the mold portions. This thin extra plastic on the molded part at the location of the parting line is referred to as "flash" or "flashing" and is usually in the shape of an undesirable thin film of plastic extending from the molded part at the parting line. This is undesirable in that the flashing gives the molded parts an undesirable appearance and may interfere with the part's performance. For example, flashing is undesirable in the manufacture of mating parts, such as a container having a complementary lid, wherein flashing at the rim of the container may prevent the lid from fitting on the container properly. Therefore, there is a need for a mold which will preclude flashing at the parting line despite being subject to the higher pressures currently utilized in modern injection molds to obtain high production rates and good surfaces on the molded product.

In order to prevent overheating of a part during molding, channels or vents having a small cross-sectional area are connected to the mold cavity to allow entrapped air to be vented from the cavity. In the press described above, the characteristics of the press and plastic channel or groove are such that a vent span of less than approximately 1 mil in cross section is sufficiently narrow to preclude molten plastic flow therethrough while still allowing for the escape of entrapped air from within the cavity, although the precise opening or space at which plastic flow will begin to occur will vary depending upon the characteristics of the mold, press and the plastic utilized.

In conventional molds, a horizontal or vertical venting groove is provided at a horizontal or vertical parting line, along which the mold portions abut, to allow venting of air from the mold cavity. Upon slight separation of the mold portions caused by the high pressure within the mold cavity, as discussed above, the cross section of the venting groove increases in direct proportion to the increase in separation distance between the mold portions. When the span of the venting groove is increased beyond a critical maximum distance due to mold separation, undesirable plastic flow into the venting groove occurs in addition to the desirable flow of entrapped air therethrough. Molten plastic flow into the venting groove is undesirable in that it results in blockage of the venting from the cavity, thereby preventing escape of entrapped air which causes overheating of parts and also results in undesirable flashing at the parting line, requiring additional machining expense to remove the flashing. Therefore, there is a need for an injection mold which provides venting while still precluding flashing at the parting line upon slight separation of adjacent mold portions.

SUMMARY OF THE INVENTION

In accordance with the present invention, an injection mold is provided having means for preventing the occurrence of flashing despite the separation of adjacent mold portions exceeding the maximum flashing separation distance. It has been found that providing an angled parting line over the section of the parting line extending immediately adjacent the mold cavity, which angled parting line is at a small angle from a vertical or horizontal of the remainder of the parting line along which the mold portions separate, rather than orienting the entire parting line horizontally or vertically as done with prior art molds, higher cavity pressures may be employed without the occurrence of flashing at the parting line. That is, though high cavity pressures may cause an increase in the separation distance between adjacent mold portions at which it becomes so large as to allow flashing thereat, the span at the angled portion of the parting line increases a significantly lesser amount in the parting direction, allowing the cross sectional distance at the angled portion to be maintained below the critical flashing distance despite the mold separation distance exceeding the critical flashing separation distance. More specifically, upon increase of the separation distance between adjacent mold portions in the parting directions, the distance at the angled portion increases only in proportion to the sine of the angle between the angled parting line and the parting direction along which the mold sections are translated.

Accordingly, the smaller the angle between the angled portion of the parting line immediately adjacent the mold cavity and vertical or horizontal, the less the space between adjacent mold portions will increase at the angled parting line upon separation of the mold portions in opposing directions. Thus, the mold portions of the present invention can be separated relative to one another due to internal cavity pressure a greater amount than current molds, without the occurrence of flashing. This, of course, leads to molding with higher production rates with less cycle time.

The invention will be described with reference to orientation of the parting line with respect to the vertical, in which direction the illustrated mold sections travel, for ease in understanding the inventive concepts. It is readily appreciated that the mold portions may be translated along any angle relative to the vertical including a horizontal direction of separation, with the portion of the parting line immediately adjacent the cavity oriented at an angle between the common line along which the mold portions are translated with respect to one another and a line perpendicular thereto. Accordingly, the spacing of the angled parting line portions in the region immediately adjacent the mold cavity increases in proportion to the angle between the angled parting line and the direction of separation, i.e. the direction in which the mold portions are translated with respect to one another.

BRIEF DESCRIPTION OF THE DRAWINGS

In the drawings, wherein like elements are referenced alike:

FIG. 1 is a cross-sectional view of a mold employed to manufacture cups, illustrating the horizontal parting lines employed with prior art molds;

FIG. 2 is an enlarged, fragmentary, cross-sectional view of a cup mold having inclined, anti-flash parting line portions adjacent the mold cavity and embodying various features of the present invention;

FIG. 3 is an enlarged, fragmentary, cross-sectional view of the mold shown in FIG. 1 illustrating the orientation of the parting line immediately adjacent the upper rim portion of the mold cavity in prior art designs;

FIG. 4 is an enlarged, fragmentary, cross-sectional view of the mold shown in FIG. 1 illustrating the orientation of the parting line immediately adjacent the lower false bottom portion of the mold in prior art designs;

FIG. 5 is an enlarged, fragmentary, cross-sectional view of the mold shown in FIG. 2 illustrating the orientation of the angled, anti-flash portion of the parting line immediately adjacent the upper rim portion of the mold cavity in molds of the present invention; and FIG. 6 is an enlarged, fragmentary, cross-sectional view of the mold shown in FIG. 2 illustrating the orientation of the angled, anti-flash portion of the parting line immediately adjacent the lower false bottom portion of the mold cavity in molds of the present invention.

DETAILED DESCRIPTION OF THE PREFERRED EMBODIMENTS

Injection molds constructed in accordance with the present invention are shown in FIGS. 2, 5 and 6. While the illustrative mold comprises three separate mold sections which move vertically relative to one another, the angled parting line concept of the present invention is employable at each of the parting lines of molds regardless of the number of mold sections employed and regardless of the separating direction, vertically or otherwise, along which the mold sections are translated relative to one another. The mold cavities illustrated herein are shown vertically as they are typically drawn to show the container product in its usual orientation for holding a product, although in the actual press described in paragraph 1 hereof, the mold cavities are at ninety degrees to the illustrations herein.

With reference to FIG. 1, a typical mold for use with the present invention is shown and referred to generally at 10. The illustrated mold generally comprises an upper mold section 12, middle mold section 14, and lower mold section 16. When the mold sections are brought together, they define an internal mold cavity 22 which in this illustrative mold is in the shape of a container cup 24 having an upper rim section 26 and a lower false bottom portion 28. Molten plastic is initially injected into the mold cavity 22 at high pressure and temperature through an injection nozzle 30; and then a higher pressure is applied which is referred to as "packing" to assure complete distribution of the thermoplastic throughout the mold cavity. During packing the mold is in what is referred to as a "packing position" and the mold cavity may be subject to pressures of approximately 30,000 psi for the press described herein. Manifestly, the pressure may be varied from the example. Upon attaining a sufficient temperature reduction within the cavity 22, the plastic hardens and the mold portions 12, 14 and 16 are thereafter separated from one another to allow for removal of the hardened molded cup 24. The mold includes a cooling duct 25 therein for the circulation of cooling water therethrough to increase the rate of cooling of the plastic within the mold cavity 22. The illustrated mold 10 is a multiple cavity mold in which sixteen cups can be made within the same mold 10 with a single, simultaneous injection of plastic into each of the sixteen cavities thereof, only one of which is shown in FIG. 1.

It is desirable to make such cups 24 as thin as possible while still maintaining good surface characteristics and the necessary structural integrity to perform required functions. To achieve this, higher injection pressures are desired to be utilized. Higher injection pressures result in greater forces urging the mold portions 12, 14 and 16 apart from one another, causing a separation at the parting lines 32 between adjacent mold portions which may result in the formation of flashing at the parting lines 32 during the molding process. By way of example, the conventional five hundred ton press used with the prior art molds illustrated in FIGS. 1, 3, and 4 made sixteen containers at a cycle time of about ten or eleven seconds and the cycle time could not be lowered by increased pressure of plastic injection, because the higher pressure caused a separation between adjacent mold portions 12 and 14, or portions 14 and 16, of greater than approximately 1 mil and resulted in undesirable flashing at the parting line 32 immediately adjacent the cavity.

In order to overcome the problem of flashing formation at the parting line in the area immediately adjacent the cavity, the parting line of the present invention has an angular disposition of the walls immediately adjacent the cavity as shown in FIG. 2, in which there is shown a mold generally designated as 100. This allows for a greater mold separation distance 131 in the vertical mold separation direction without the occurrence of flashing. Herein, mold 100 includes an upper mold portion 112, a middle mold portion 114 and a lower mold portion 116.

To allow for greater injection and/or packing pressures to be employed without causing flashing upon the increased separation distance or space 131 in the separate direction between adjacent mold sections associated with employment of increased pressures, a section 134 of the parting line 132 located adjacent to the cavity and extending a small distance immediately outward of the mold cavity 122 is oriented at a slight angle from vertical, rather than extending horizontally as was done previously in the prior art as shown in FIG. 1. The remainder of the parting line 132, outward of the angled section 134, extends in the conventional horizontal direction. The angled section 134 of the parting line 132 allows for greater vertical separation of the mold sections with respect to one another, as will occur with utilization of increased pressures, without allowing the distance 136 between adjacent mold sections in the region of the angled parting line 134 to exceed a predetermined maximum e.g. 1 mil, and allow plastic flow.

That is, with prior art molds, as shown in FIGS. 1, 3 and 4, the parting line 32 extended horizontally from the mold cavity 22, whereby the separation distance or space 31 at the parting line 32 adjacent the mold cavity increased an amount equal to the amount of vertical translation between adjacent mold sections. With reference to FIGS. 2, 5 and 6, it is seen that by orienting the portion of the parting line 134 immediately adjacent the mold cavity 122 at an angle, as is done with molds constructed in accordance with the present invention, the gap or space 136 at the angled parting line portion 134 will increase only in proportion to the sine of the angle of the angled parting line 134 from vertical. Thus, by way of example, with the angled portion 134 of the parting line 132 oriented at 10° from vertical, an increase in the separation distance 131 between adjacent mold sections of 5 mil in the vertical direction will result in only approximately 0.868 mil increase in the distance 136 at the angled parting line 134 rather than the 5 mil span increase which would otherwise occur with a completely horizontal parting line. The preferred range of angles of the angled parting lines is between 0°30' and 25°, and more preferably between 5° and 15°.

Accordingly, since flashing will only occur in the space 136 of the angled parting line 134 when the space exceeds a predetermined maximum amount, the injection pressure can be increased an amount even though it causes a relative separation of adjacent mold sections in opposing vertical directions by an amount greater than the conventional predetermined maximum separation distance 131 while still keeping the distance 136 at the angled parting line 134 less than the predetermined maximum allowable, or "critical flashing distance" without production of flash. For instance, with typical plastics used in the illustrated press and molds of the present invention, no flashing will occur until the distance 136 at the angled parting line 134 exceeds approximately 1 mil. Thus, with reference to the above example, even the 5 mil vertical separation between adjacent mold sections will not result in the span 136 at the angled parting line 134 exceeding the 1 mil critical flashing distance and, hence, no flashing will occur. This is true despite the fact that there would be a 5 mil separation distance 131 at the horizontal parting line 132, since plastic would not be allowed to reach the remainder or horizontal portion of the parting line 132. That is the plastic would not be able to pass through the narrow angled parting line distance 136 which is located adjacent the mold cavity to flow into the 5 mil separation at horizontal portions of the parting line 132.

It is well known in the plastic molding industry to provide venting of the injection mold cavity 122 by including a venting groove 140 leading into a venting collector ring 142 as shown in FIG. 2 to exhaust air from the mold and to prevent mold overheating, and to prevent the occurrence of flow lines in the part. Air being a compressible fluid will, if trapped, heat rapidly. The temperature of compressed air rises approximately one degree for each corresponding increase in pressure of one psi. Hence, air trapped within the mold cavity 122 is subjected to high pressure and may attain sufficiently high temperatures to cause scorching or blackening of the plastic material. Both the venting groove 140 and the venting collector ring 142 extend about the periphery of the mold cavity 122. The venting groove 140 operates on the aforementioned physical principle that with a sufficiently narrow cross section 136, air can pass therethrough but plastic cannot. Accordingly, by maintaining the relief groove 140 sufficiently narrow, air from the mold cavity 122 will be able to pass therethrough into the venting collector ring 142, while the plastic will be precluded from passing through the relief groove 140 due to its narrow span 136. Thus, the width of the venting collector ring 142 is not important in preventing flashing since plastic will be blocked at the venting groove 140 and precluded from passing into the venting collector ring 142.

The venting groove 40 of prior art injection molds is located at the horizontal parting line 32, as shown in FIG. 1, so that upon opening of the mold 10 between each injection of plastic therein, the air pressure accumulated within the venting collector ring 42 is released to the atmosphere and the collector ring 42 can thereafter receive the vented air upon each subsequent injection. The venting grooves 140 of molds constructed in accordance with the present invention, having their angled parting line venting groove 140 immediately adjacent the mold cavity 122, are located at the angled parting line section 134. In the preferred embodiment, shown in FIGS. 2, 5 and 6, the venting groove 140 is angled along the angled parting line 134 at the location immediately adjacent the mold cavity.

The angled venting groove 140 may extend along the entire length of the angled parting line 134, from the mold cavity 122 to the horizontal parting line 132, as shown extending from the upper rim 126 in FIG. 2; or, the angled venting groove 140 may extend along only a section of the angled parting line 134, terminating prior to reaching the horizontal parting line 132. The important factor is that if an angled venting groove 140 is provided, it must be in communication with the mold cavity 122 and of a sufficiently narrow cross section 136 maintained thereat to preclude passage of plastic therethrough.

Orientation of the venting groove 140 at an angle, along the angled parting line, allows the distance 136 at the venting groove 140 to be maintained sufficiently narrow despite a separation of the mold sections brought about by high pressure within the cavity 122 than would open the non-angled venting groove of FIG. 1 to a distance allowing plastic flow into the venting groove 40. For reasons discussed above, the closer the angle of the venting groove 140 from vertical, the greater the adjacent mold sections can separate relative to one another without the distance 136 at the venting groove 140 becoming sufficiently wide to allow plastic flow therethrough.

Accordingly, by way of example, a narrow, angled venting groove, 140, such as that shown in FIGS. 5 and 6 may be provided along the angled parting line 134 by machining away a thin groove in at least a portion of the mold walls such that the cross section of the groove is about 0.5 mil. If the adjacent mold sections then separate vertically 5 mils due to internal cavity pressure, then the distance or cross section at 136 at the venting groove 140 will be increased to only approximately 0.868 mil, which distance 136 is still below the maximum 1 mil allowable before the occurrence of flashing, and hence no flashing will occur.

In the preferred embodiment, the angled parting line 134 extends generally continuously from the section of the mold cavity 122 thereat, extending at approximately the same angle as that section of the mold cavity 122. This is illustrated in the cup mold 100 of FIG. 2 in which parting line 134, having venting groove 140, extends generally continuously from the lip 126 at the top of the cup 124, and is, accordingly, at a greater angle from vertical than the parting line 134 extending from the false bottom 128 of the cup 124 since the cavity 122 of the false bottom 128 at the parting line extends closer to vertical than the cavity 122 of the lip 126. It is not necessary that each of the plurality of parting lines of molds having multiple mold sections be oriented at the same angle with respect to one another.

Certain shapes of molded parts lend themselves to the angled parting line concept of the present invention more than other shapes. Accordingly, this can be taken into account in the designing stages, where possible, to design a part which better lends itself to utilization of an angled parting line portion 134 adjacent the cavity. One factor which is taken into account in designing the cup mold 100 of FIG. 2 is the thickness of mold metal at the lip section 144 of the mold. If the lip section 144 of the mold is too narrow in its thickness in the radial direction, it will break off from the remainder of the metal of the mold section 114 should any plastic remnant be remaining thereat upon bringing together of the upper mold section 112 and the middle mold section 114.

It is readily appreciated that an increase in the separation distance 131 at a parting line will result in an increase in both the thickness of the molded component and the length of the component. With the mold 100 illustrated in FIG. 2, for instance, any increase in the separation distance between mold sections 112 and 114 will result in a corresponding equal increase in the thickness of the horizontal section 146 of the rim 126 and the thickness of the bottom 149 with a lesser increase in thickness of the remainder of the rim 126 and the sidewalls 148 of the cup 124. The cost of the additional plastic material which may be required to be utilized with molds of the present invention, due to the increased component thickness, is outweighed by the significantly increased production rates attainable and also the elimination of scrapping of parts having flash thereon.

By way of example, a prior art sixteen cavity mold used to manufacture thin dairy containers was run on a 500 ton press and provided a 10 to 11 second cycle time. A larger press could not be used to increase production speeds since greater packing pressures would result in greater mold separation, resulting in flashing. When the same mold was provided with an angled parting line, greater packing pressure could be employed to allow for increased production rates. When the mold was provided with an angled parting line, the dairy containers could be run at higher pressure, on a 1,000 ton press, with a 5 to 6 second cycle time.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. For instance, molds of the present invention can be utilized with materials other than plastics. Therefore, it is intended that the invention not be limited to the particular embodiment disclosed as the best mode contemplated for carrying out this invention, but that the invention will include all embodiments falling within the scope of the appended claims.

What is claimed is:

1. A mold for injection molding plastic components, comprising:

a first mold section;

a second mold section defining with said first mold section at least one cavity of a desired component shape and further defining a parting line at the interface of the first and second mold sections;

said first and second mold sections being movable relative to one another in a separating direction, between an initial closed, non pressurized position in which the separation distance between opposing mold sections at the parting line is sufficiently narrow to preclude plastic flow therethrough, and a pressurized position in which the separation distance between opposing mold sections is increased;

an angled, anti-flash portion of said parting line extending immediately outward from said cavity;

said angled, anti-flash portion of said parting line defining a space between the opposing first and second mold sections when in the initial closed position, the increase in the distance of the anti-flash parting line portion upon separation of the mold sections at the pressurized portion being in proportion to the sine of the angle of the angled parting line portion from the separating direction to preclude plastic flow from the mold cavity into the anti-flash portion of the parting line even though the remainder of the parting line is separated by a distance sufficiently great that would allow plastic flow.

2. A mold in accordance with claim 1 wherein said angled portion of said parting line includes a venting groove in communication with said cavity, said venting groove extending at least part way along the length of the angled portion of said parting line.

3. A mold in accordance with claim 2 including a collecting ring at the end of the venting groove opposing the cavity end thereof, for receiving air from the mold cavity.

4. A mold in accordance with claim 3 in which the parting line includes a generally horizontal portion outward of said angled portion and the collecting ring is located at the intersection of the venting groove and the generally horizontal portion of the parting line.

5. A mold in accordance with claim 2 in which the width of the venting groove is proportioned so that the space thereat between opposing wall sections is less than 1 mil upon separation of the mold sections.

6. A mold in accordance with claim 1 wherein the space at the angled portion of the parting line in said initial position is approximately zero, with the opposing mold sections initially abutting one another.

7. A mold in accordance with claim 1 wherein the space at the angled portion of said parting line in said initial position is less than 1 mil.

8. A mold in accordance with claim 1 in which the angled portion of said parting line extends between 0°1′ and 25°0′ from the separating direction.

9. A mold in accordance with claim 1 wherein said parting line extends horizontally over the portions thereof outward of said angled portion.

10. A mold in accordance with claim 1 wherein the angled portion of the parting line extends generally continuously from the exterior surface of the molded component, with the angled portion of the parting line extending at an angle generally defined by the angle of the exterior surface of the molded component at the parting line.

11. An injection mold for injection molding plastic cups wherein said cups have both a rim and a false bottom integral with a cup body, said mold comprising:

a first male mold section;

a second male mold section;

a female mold section complementary to said first male mold section at one end thereof, and complementary to said second mold section at an opposing end thereof, defining a cavity between the respective first and second male and female mold sections of a desired cup shape; said first male mold section defining the shape of the exterior of the rim and the interior of the cup body; said second male mold section defining the interior of the false bottom; and said female section defining the interior of the rim, the exterior of the cup body, and the exterior of the false bottom;

said respective complementary first and second male and female mold sections each being movable relative to one another along a common translating line;

said complementary female mold section and first male mole section defining a first parting line along which the female mold section and first male mold sections meet;

said complementary female mold section and second male mold section defining a second parting line along which the female mold section and second male mold sections meet;

said first parting line including a first angled section extending immediately outward from the edge of the rim section of the mold cavity and extending at an angle between the common line along which the mold sections are translated and a line perpendicular thereto, the increase in the spacing at said first angled section of said first parting line upon relative separation of the first male mold section and the female mold section being proportional to the sine of the angle of the first parting line with respect to the common translating line, the spacing at the first angled parting line thereby being maintained below a predetermined maximum, below which no plastic will flow therethrough, despite the separation between mold sections exceeding the predetermined maximum, to minimize the formation of flashing at the rim; and said second parting line including a second angled section extending immediately outward from the edge of the false bottom section of the mold cavity and extending at an angle between the common line along which the mold sections are translated and a line perpendicular thereto, the increase in the spacing at said second angled section of said second parting line being proportional to the sine of the angle of the second parting line with respect to the common translating line, the spacing at the second angled parting line thereby being maintained below a predetermined maximum below which no plastic will flow therethrough despite the separation between mold sections exceeding the predetermined maximum to minimize the formation of flashing at the false bottom.

* * * * *

UNITED STATES PATENT AND TRADEMARK OFFICE
CERTIFICATE OF CORRECTION

PATENT NO. : 5,217,732
DATED : June 8, 1993
INVENTOR(S) : Rudolf, et al.

It is certified that error appears in the above-identified patent and that said Letters Patent is hereby corrected as shown below:

Column 2, line 34, delete "a" (second occurrence).

Column 5, line 54, after "is" insert --,--.

Column 9, line 4, change "mole" to --mold--.

Signed and Sealed this

First Day of March, 1994

BRUCE LEHMAN

Attesting Officer     Commissioner of Patents and Trademarks